United States Patent [19]

Baroni

[11] 4,291,347
[45] Sep. 22, 1981

[54] EIGHT TRACK TAPE ALIGNMENT INSTRUMENT

[76] Inventor: James T. Baroni, Box 113, Elton, Pa. 15934

[21] Appl. No.: 125,143

[22] Filed: Feb. 27, 1980

[51] Int. Cl.³ .................... G11B 15/66; G11B 23/00
[52] U.S. Cl. .................................................. 360/93
[58] Field of Search ................. 360/93, 92, 135, 137; 242/197, 199, 55.19 A; 226/90

[56] References Cited

U.S. PATENT DOCUMENTS

| | | | |
|---|---|---|---|
| 3,445,116 | 5/1969 | Knox | 360/93 |
| 3,716,243 | 2/1973 | O'Neal | 360/93 |
| 3,996,618 | 12/1976 | Suzuki | 360/93 |
| 4,044,390 | 8/1977 | Yamashita | 360/93 |
| 4,071,858 | 1/1978 | Ejiri | 360/93 |

*Primary Examiner*—Alfred H. Eddleman
*Attorney, Agent, or Firm*—W. Britton Moore

[57] ABSTRACT

An eight track tape alignment instrument for selective application to and use between the tape cartridge receiving cavity and the tape cartridge of conventional magnetic tape players so as to wedgingly apply uniform pressure between the cartridge wheel and the capstan and cause travel of the magnetic tape past and proper alignment thereof relative to the decoding and electronic sound converting head to prevent slow and non-uniform travel or malfunctioning of the tape and misalignment of the latter relative to the head creating crosstalk problems and thereby insuring of quality reproduction through the speakers. The instrument is preferably plastic, and is small, light, relatively short and narrow, and wedge-shaped so as to be grasped between the index finger and thumb and the tapered end thereof selectively inserted between the front face of the cartridge and the walls of its cavity and pushed inwardly to correct any misalignment between the cartridge wheel and capston.

5 Claims, 10 Drawing Figures

EIGHT TRACK TAPE ALIGNMENT INSTRUMENT

BACKGROUND OF THE INVENTION

This invention relates to an eight track tape aligning instrument for readjusting the pressure between the magnetic tape of a tape cartridge and the capstan of a tape player.

Eight track tape cartridges and the tapes thereof tend to wear through use which results in malfunctioning and/or a poor quality of sound. This wear causes a lack of pressure between the magnetic tape, inside the tape cartridge, and the capstan, which pulls the tape across the head. Such a condition either results in the tape revolving at an improper and usually slower speed and causes the tape to flutter, warble, squeal, or fail to play, or a misalignment of the tape and the relationship of the tracks thereof with the head, resulting in crosstalk, e.g., two tracks playing simultaneously. Heretofore, there has been no instrument readily available for use by the listener of a tape player for easy application thereto to create a tighter fit between the cartridge and its tape and the tape player capstan to remedy such malfunctioning.

SUMMARY OF THE INVENTION

The principal object of the present invention is to provide an eight track tape aligning instrument for insertion between a tape cartridge and its receiving cavity in a tape player so as to enable readjustment of the pressure between the magnetic tape and the capstan of a tape player.

Another object is the provision of a relatively light, short, narrow, and wedge-shaped instrument having a tapered end for grasping and selective insertion between the front wall of a tape cartridge and a wall of its receiving cavity whereby inward pressure thereon will adjust the pressure between the cartridge wheel and the capstan and insure proper travel of the magnetic tape relative to the head.

Still another object is to provide such a wedge-shaped instrument having one end enlarged and formed with a bore therethrough to accommodate an index finger and thumb of the user and facilitate handling and manipulation thereof.

A further object is the provision of a relatively small, lightweight plastic, tapered wedging instrument, approximately two inches in length and five sixteenths of an inch at its enlarged end sloping to near zero at its tapered end, so as to be adaptable for use with every type of tape player in creating pressure between the capstan and the magnetic tape controlling cartridge wheel, and which is easily handled and readily stored.

These and other objects and advantages will be apparent as the specification is considered with the accompanying drawings, wherein FIG. 1 is a top plan schematic view of a conventional tape player with a tape cartridge in playing position therein, showing the relationship between the magnetic tape, cartridge wheel, capstan, and head, and an aligning instrument in one preselected full line position assumed to adjust pressure between the capstan and cartridge wheel, and two additional preselected instrument positions also being shown in dotted lines;

DETAILED DESCRIPTION

Figure 1:
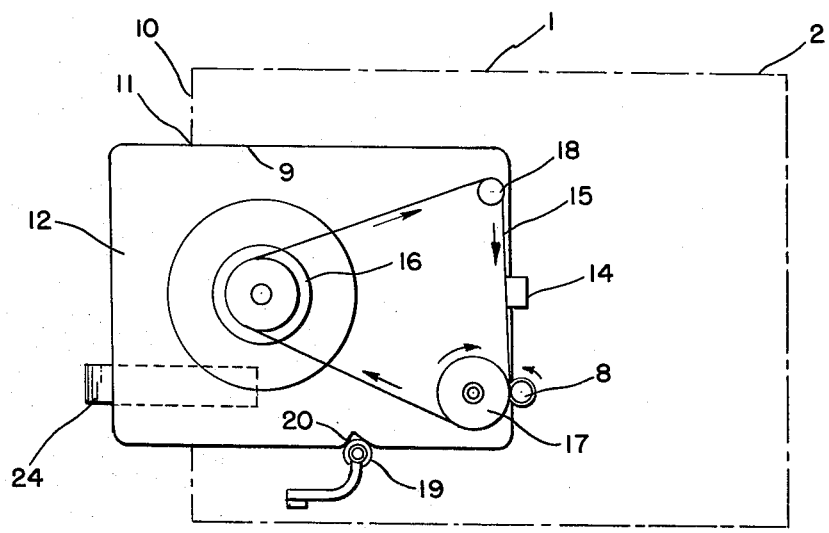
Figure 2:
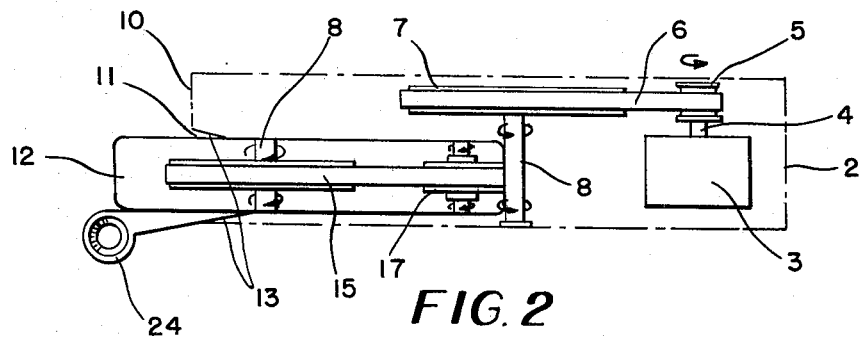
FIG. 2 is a schematic side view showing the FIG. 1 relationship, and the fly wheel, drive belt and pulley, and motor for rotating the capstan, and showing the aligning instrument in the full line position of FIG. 1.
Figure 3:
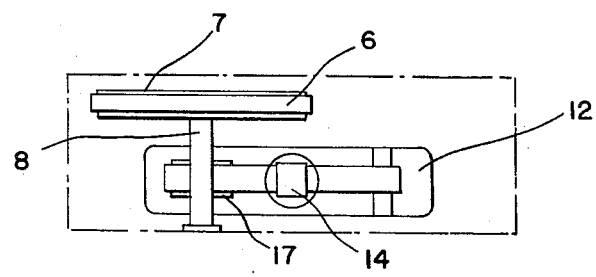
FIG. 3 is a schematic rear end view showing the relationship between capstan, fly wheel, and the cartridge wheel, magnetic tape, and head.

Referring more particularly to the drawings, wherein similar reference characters designate like parts throughout the several views, numeral 1 identifies a conventional eight track tape player, which does not constitute a part of this invention, except to the extent that the aligning instrument hereof is used therewith, so the tape player is only schematically shown in FIGS. 1-3.

Tape player 1 usually includes a generally rectangular housing 2, with the operating components suitably arranged therein and customarily including an electric motor 3 having a driven shaft 4 with a pulley 5 on the upper end thereof for driving a belt 6 and a fly wheel 7 on the upper end of and for rotating a capstan 8. The latter is arranged at the inner end and generally to one side of the usual generally rectangular tape cartridge receiving cavity or pocket 9 which opens, as at 11, into a front wall 10 of the housing and receives a conventional generally rectangular tape cartridge 12. The forward or mouth edges of the cartridge cavity are usually tapered, as at 13 (FIG. 2), to facilitate the entry and positioning of the tape cartridge therewithin. The usual electronic head 14 is located centerwise at the inner end of cavity 9 for customary engagement with an eight track magnetic tape 15 arranged, in the usual manner, in a cartridge tape reservoir 16. Tape 15 extends over a cartridge wheel 17 at one rear corner of the cartridge and, thence, over a tape guide 18 at the other rear corner. Capstan 8 is rotatable, in a counter clockwise direction viewing FIG. 1, and engages with and drives the tape passing over the cartridge wheel 17, in a clockwise direction, so that the tape is conveyed across the head 14 and the magnetic impulses converted into sound which emanates from the usual speaker system, not shown. As best shown in FIG. 1, the cartridge 12 is usually latched and retained in cavity 9 by a spring pressed roller 19 engaging a notch 20 in a side wall thereof.

It is customary for the magnetic tape to travel within the cartridge and be conveyed across head 14 at a speed of 3¾ inches per second, so it is essential that the tape be properly aligned therewith, with inward pressure of the cartridge pressing the cartridge wheel 17 and the tape against capstan 8. A lack of such pressure, between the capstan and wheel, results in the tape traveling at a slower speed, which produces a warbling noise and poor quality reproduction being emitted through the speakers. That is, the tape will play slow and flutter, or simply not play at all.

Figure 4:
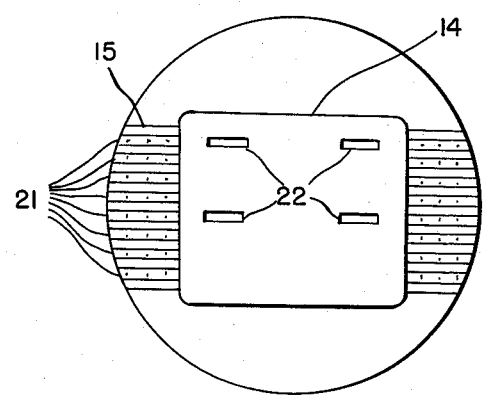
FIG. 4 is a schematic front elevation of a conventional head with four decoding orifices, and a conventional magnetic tape with eight tracks of magnetically structured particles which are decoded and electronically converted by the head into sounds.
Figure 5:
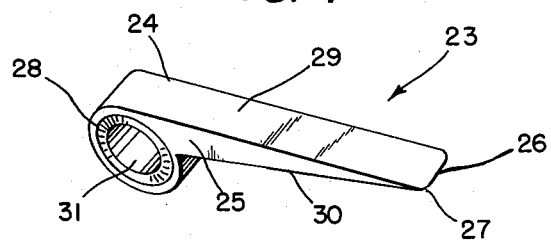
FIG. 5 is a perspective view of an eight track aligning instrument.
Figure 6:
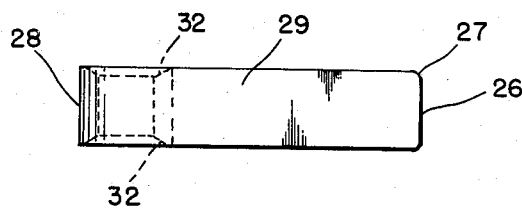
FIG. 6 is a top plan view of the instrument.
Figure 7:
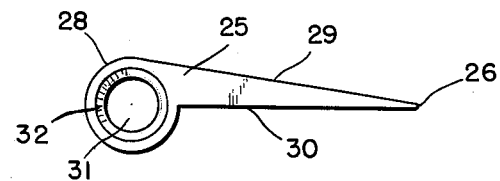
FIG. 7 is a side elevation thereof.
Figure 8:
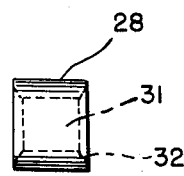
FIG. 8 is a rear elevation thereof.
Figure 9:
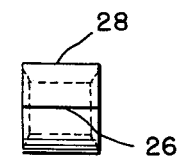
FIG. 9 is a front elevation thereof.
Figure 10:
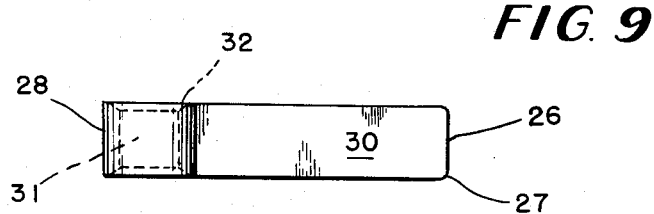
FIG. 10 is a bottom plan view thereof.

In addition to the above, a second malfunction, attributable to the lack of proper pressure, is a misalignment of the magnetic tape relative to the head. As schematically shown in FIG. 4, the magnetic tape 15 has eight tracks or rows 21 of magnetically structured particles which are decoded and electronically converted into sounds exactly as recorded, by head 14 and the entire circuitry of the tape player. Thus, the head has four precisely engineered, dimensioned, and spacedly arranged orifices 22 which effect this decoding. Unless the tracks 21 are precisely aligned with the orifices, crosstalk develops, with two tracks playing as one, which causes inferior reproduction. As the head precisely aligns two tracks with the four orifices, existence of four channels is effected. Numbering the tracks 21 from top to bottom 1 through 8, channel 1 aligns track 1 on the upper orifices, and track 5 on the lower orifices, with channel 2 aligning tracks 2 and 6, respectively, which continues up to channel 4. an electromagnet, not shown, raises and lowers the head, when controlled by the usual switch, also not shown, to determine the channel 1 through 4.

While the crosstalk problem is not as common as the slow playing malfunction, which frequently occurs due to age of the tape and/or constant use, the problems are readily and efficiently overcome by use of the present aligning instrument, now to be described.

As best shown in FIGS. 5–10, this instrument may be formed of any suitable light weight material, such as plastic, and includes an elongated wedge-shaped flat body 24, approximately two inches (2") long tapering from a thickness of approximately five sixteenths (5/16") of an inch at its rear end 25 to a near zero front end 26, having somewhat rounded corners 27. Integrally formed at rear end 25 is a circular hollow ring 28 which extends from the flat top wall 29 and laterally of the flat bottom wall 30 so as to be offset therefrom. Ring 28 has a bore 31 extending transversely therethrough, with its opposing ends being tapered inwardly as at 32. As the body and the annulus of ring 28 may be only seven sixteenths (7/16") of an inch in width, it will be evident that the device is very small with the ring functioning as a handle which may be readily grasped between an index finger and thumb of the same hand. The latter will snugly fit into the opposing tapered ends 32 and facilitate and simplify manipulation of the device.

When adjustment of the pressure between the cartridge wheel and capstan is required, the somewhat sharp tapered front end 26 of the wedge-shaped body 24 may be inserted at the front end of cartridge cavity 11 and below the bottom edge of tape cartridge 12 and pushed inwardly sufficiently to slightly wedge and elevate or tilt the front end of the cartridge and cause a slight inward movement or adjustment of the cartridge wheel 17 relative to capstan 8. This, of course, creates pressure therebetween and insures travel of the magnetic tape at the desired speed, so as to correct malfunctioning. In over fifty percent of the malfunctioning situations, the wedging instrument may be inserted under the bottom right hand corner of the cartridge, viewing FIG. 1. In others, the point of application or insertion may be at the bottom left hand corner, or along the left hand side of the cartridge. In any of these locations, insertion of the wedge-shaped instrument elevates the tape and draws it in tighter to the capstan to create the necessary pressure. Occasionally, the tape becomes wound incorrectly inside the cartridge, which can usually be corrected by making one complete revolution of the tape, with the wedge in a preselected position.

This instrument is not to be used for recordings. In addition, it should be removed from the tape player, if equipped with automation ejection, before ejecting.

While a proposed embodiment of wedge-shaped aligning instrument has been herein shown and described, it is to be understood that various changes and improvements may be made therein without departing from the scope and spirit of the appended claims.

What I claim is:

1. An eight track magnetic tape alignment instrument for use with a tape player including a housing having a motor driven capstan therein and formed with a generally rectangular cavity for receiving a generally rectangular tape cartridge having a magnetic tape wound and rotatable therein for conveyance over a cartridge wheel at one end of said cartridge, said wheel and said tape engaging with and being driven by said capstan, comprising an elongated narrow flat body, said body tapering from a relatively thick rear end to a near zero front end, ring-like hollow handle means integrally formed on and projecting from said rear end whereby said handle means may be grasped between a finger and thumb of the same hand to wedgingly insert said tapered front end under the front of and for tilting the forward end of said cartridge upwardly and pushing said cartridge wheel end magnetic tape inwardly relative to said capstan to create a tighter driving fit therebetween and correct any misalignment of said tape and insure travel thereof at the desired speed to correct malfunctioning.

2. In a device according to claim 1, wherein said ring-like handle is circular and generally offsetedly extends to one side of said rear end.

3. In a device according to claim 2, wherein said ring-like handle is formed with a transverse bore therein.

4. In a device according to claim 3, wherein said bore is tapered at its opposing ends to snugly accommodate and index finger and thumb.

5. In a device according to claim 4, wherein said elongated body has flat upper and lower faces and said ring-like handle means is of the same narrow width as said body.

* * * * *